(No Model.)
J. R. BAILEY.
DRAWING KNIFE.
No. 376,277. Patented Jan. 10, 1888.
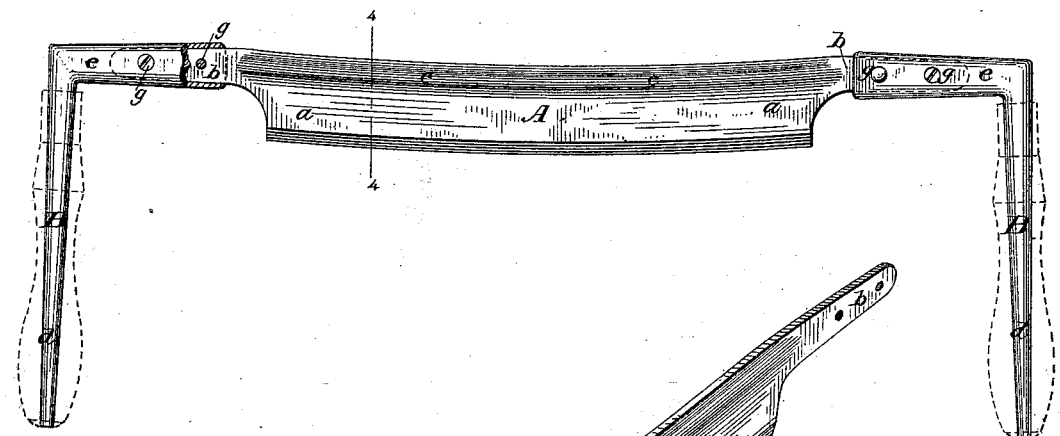
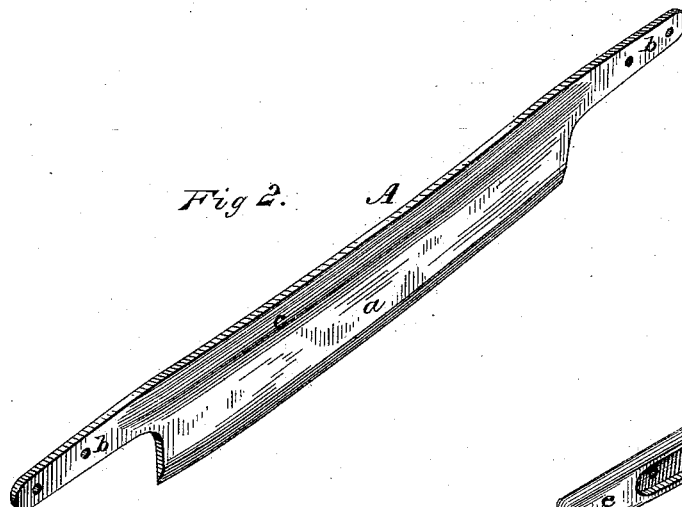
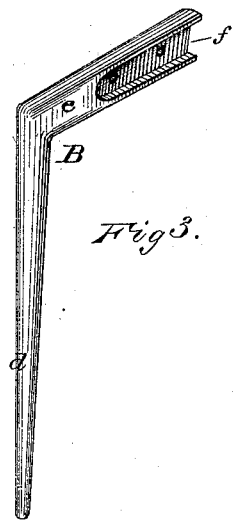
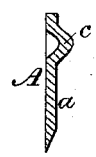
WITNESSES:
Harry King
C. O. Heed
INVENTOR:
Joseph R. Bailey
By his Atty:
F. C. Somes

UNITED STATES PATENT OFFICE.

JOSEPH R. BAILEY, OF BROOKLYN, NEW YORK.

DRAWING-KNIFE.

SPECIFICATION forming part of Letters Patent No. 376,277, dated January 10, 1888.

Application filed June 27, 1887. Serial No. 242,587. (No model.)

*To all whom it may concern:*

Be it known that I, JOSEPH R. BAILEY, a citizen of the United States, residing at Brooklyn, in the county of Kings and State of New York, United States of America, have invented a certain new and useful Improvement in Drawing-Knives, of which the following is a specification.

The object of this invention is to provide a drawing-knife combining cheapness of construction with superior cutting qualities.

Figure 1 of the accompanying drawings is a plan view of this improved drawing-knife. Fig. 2 is a perspective view of the blade detached from the handles. Fig. 3 is a perspective view of one of the handles. Fig. 4 is a cross-section of the blade on line 4 4 of Fig. 1.

Similar letters of reference indicate corresponding parts in the different figures.

This improved drawing-knife comprises a blade, A, and handles B.

The blade A, comprising the body $a$, the tangs or shanks $b\ b$ at opposite ends thereof, and the concavo-convex rib $c$, extending longitudinally of the blade near the back edge thereof, is struck out from a piece of sheet-steel, the rib $c$ being struck up from the back of the blade at the same operation. The cutting-edge is then formed and the blade is properly tempered. The handles are angular in shape, each comprising a handle proper, $d$, and a short arm, $e$, at right angles thereto. The arms of the handles project toward each other, and each is provided with a recess, $f$, adapted to receive one of the shanks $b$ of the blade A. Screws or rivets $g$ are passed through the arms of the handles and the shanks of the blade to firmly unite the blade to the handles. The blade thus constructed can be made from comparatively thin sheet-steel, the rib, which is struck up without additional expense, serving to impart sufficient rigidity and strength. The blade, being of a uniform thickness throughout, can be evenly tempered without difficulty, and a superior quality of steel may be employed.

When the blade is worn out, it can be replaced by another adapted for the same handles.

A drawing knife thus constructed can be produced very cheaply, and, the handles being detachable from the blade, it can be packed very compactly for transportation.

I claim—

An elongated blade having shanks at each end and a longitudinal concavo-convex rib along the body, the whole being composed of sheet-steel, in combination with angular handles, the inwardly-projecting arms of which are provided with recesses into which the shanks of the blade are fitted, and fastening devices uniting said arms and shanks, substantially as described.

JOSEPH R. BAILEY.

Witnesses:
DALE D. BUTLER,
CLARENCE E. BACON.